United States Patent [19]

Kim

[11] Patent Number: 5,577,421
[45] Date of Patent: Nov. 26, 1996

[54] OIL SUPPLYING STRUCTURE FOR GEAR SHAFT BEARING OF TRANSMISSION FOR VEHICLE

[75] Inventor: Sunghoon Kim, Kyungki-do, Rep. of Korea

[73] Assignee: Hyundai Motor Company, Seoul, Rep. of Korea

[21] Appl. No.: 358,543

[22] Filed: Dec. 14, 1994

[30] Foreign Application Priority Data

Dec. 14, 1993 [KR] Rep. of Korea ...................... 93-27575

[51] Int. Cl.$^6$ .................................................. F16H 57/02
[52] U.S. Cl. .......................................................... 74/606 R
[58] Field of Search ............................. 74/606 R, 421 A, 74/421 R; 475/116, 131, 246

[56] References Cited

U.S. PATENT DOCUMENTS

| 5,025,673 | 6/1991 | Yamada | 74/606 R X |
| 5,111,715 | 5/1992 | Farris | 74/606 R |
| 5,156,576 | 10/1992 | Johnson | 74/606 R X |
| 5,191,813 | 3/1993 | Havens | 74/606 R |
| 5,211,077 | 5/1993 | Louis et al. | 74/606 R |
| 5,284,067 | 2/1994 | Seaman | 475/246 |
| 5,287,769 | 2/1994 | von Kaler | 74/606 R |
| 5,291,801 | 3/1994 | Hanada et al. | 74/606 R |
| 5,295,413 | 3/1994 | Sherman | 74/421 A |
| 5,327,800 | 7/1994 | Van Selous | 475/131 |
| 5,413,014 | 5/1995 | Kameda et al. | 74/606 R |

FOREIGN PATENT DOCUMENTS

| 2547007 | 12/1984 | France | 74/606 R |
| 4121299 | 1/1992 | Germany | 74/606 R |
| 590867 | 7/1947 | United Kingdom | 74/606 R |
| 2026630 | 2/1980 | United Kingdom | 74/606 R |
| 2221733 | 2/1990 | United Kingdom | 74/606 R |

Primary Examiner—Vinh T. Luong
Attorney, Agent, or Firm—Birch, Stewart, Kolasch & Birch, LLP

[57] ABSTRACT

An oil supplying structure for a gear shaft bearing of a transmission for a vehicle includes a housing on which a gear shaft having a plurality of gears is disposed, a gear shaft supporting boss integrally extending from an inner surface of the housing, a fixing hole through which the gear shaft bearing is disposed to rotatably support the gear shaft, the fixing hole being formed on the supporting boss, an oil guide channel defined by the supporting boss and the housing for guiding oil scattered by a differential gear and an oil passage communicating the fixing hole with the oil guide channel for supplying the oil flowing along the oil guide channel to the bearing.

12 Claims, 4 Drawing Sheets

OIL SUPPLYING STRUCTURE FOR GEAR SHAFT BEARING OF TRANSMISSION FOR VEHICLE

BACKGROUND OF THE INVENTION

1. Field of the Invention

This invention relates to an oil supplying structure for a gear shaft bearing of a transmission for a vehicle and, more particularly, to a structure which can improve lubrication by stably supplying oil scattered by a rotation of a differential gear to each gear shaft bearing.

2. Description of the Conventional Art

In general, a transmission for a vehicle provides the mechanical advantage that enables the engine to propel the vehicle under various loads. It also furnishes the driver with a selection of vehicle speeds while the engine is held at speeds within the effective torque range. The purpose of the transmission is to provide the operator with a selection of gear ratio between engine and wheels so that the vehicle can operate at an optimal efficiency under a variety of driving conditions and loads, to provide reverse, and to allow engine braking.

The transmission comprises a transmission housing containing input and output shafts on which a plurality of gears are disposed. In case of front-wheel drive vehicles, a differential gear and a final reduction gear are integrally formed at an end of the output shaft.

In the transmission described above, to support the input and output shafts, a supporting boss 100 is formed on the inside surface of the housing and the shafts are rotatably supported on each rolling bearing interposed in fixing holes each formed on the supporting boss. Oil should be sufficiently supplied to the rolling bearings in order to minimize power loss by reducing the friction drag and to prevent the abrasion of the rolling bearing.

However, when supporting the input and output shafts to the housing, it is conventional up to now that bearings 103 and 104 are inserted in respective fixing holes 101 and 102 and the input and output shafts 105 and 106 are supported on the respective rolling bearings 103 and 104 as shown in FIG. 5.

Accordingly, the oil filled up in the housing with predetermined oil level is sufficiently supplied for each portion of the gears but is not sufficiently supplied for the bearings inserted in the fixing holes of the supporting boss such that friction drag of the bearings increases and the abrasion of the bearings as well as power loss is extreme.

SUMMARY OF THE INVENTION

The present invention is made in an effort to solve the above problems.

It is an object of the present invention to provide an oil supplying structure for a gear shaft bearing of a transmission for a vehicle which can improve lubrication by stably supplying oil which is scattered by a differential gear to each gear shaft bearing.

To achieve the above objects, the present invention provides a gear shaft supporting boss having a shape which defines an oil guide channel with an inner surface of a gear housing for stably supplying oil scattered by a differential gear to a bearing.

The oil guide channel is provided with an oil passage which communicates with the bearing to supply the oil thereto.

BRIEF DESCRIPTION OF THE DRAWINGS

The above and further objects, details and advantages of the present invention will become apparent from the following detailed description of a preferred embodiment thereof, when read in conjunction with the accompanying drawings and, wherein.

DETAILED DESCRIPTION OF THE PREFERRED EMBODIMENT

The present invention will now be described in detail with reference to the accompanying drawings.

Figure 1:
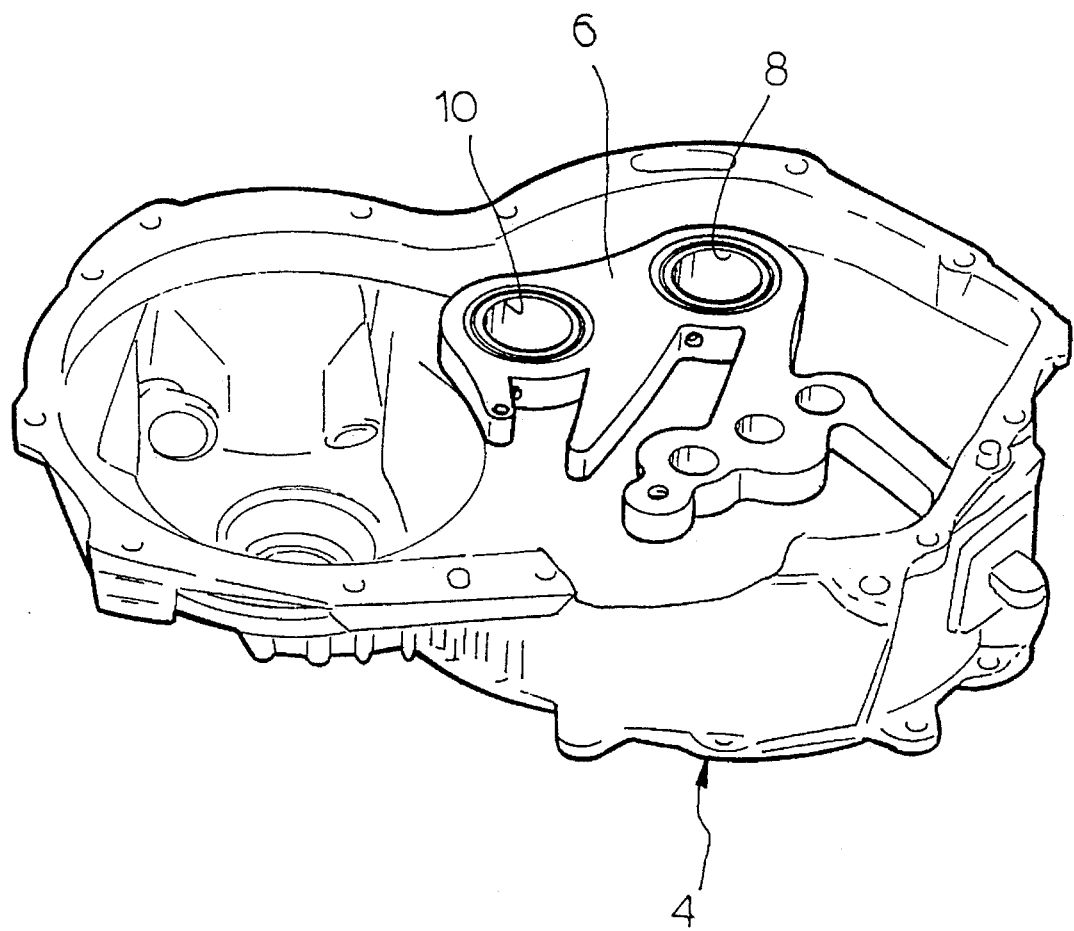
FIG. 1 is a partial perspective view showing a transmission housing provided with an oil supplying structure for a gear shaft bearing of a transmission for a vehicle according to a preferred embodiment of the present invention.
Figure 2:
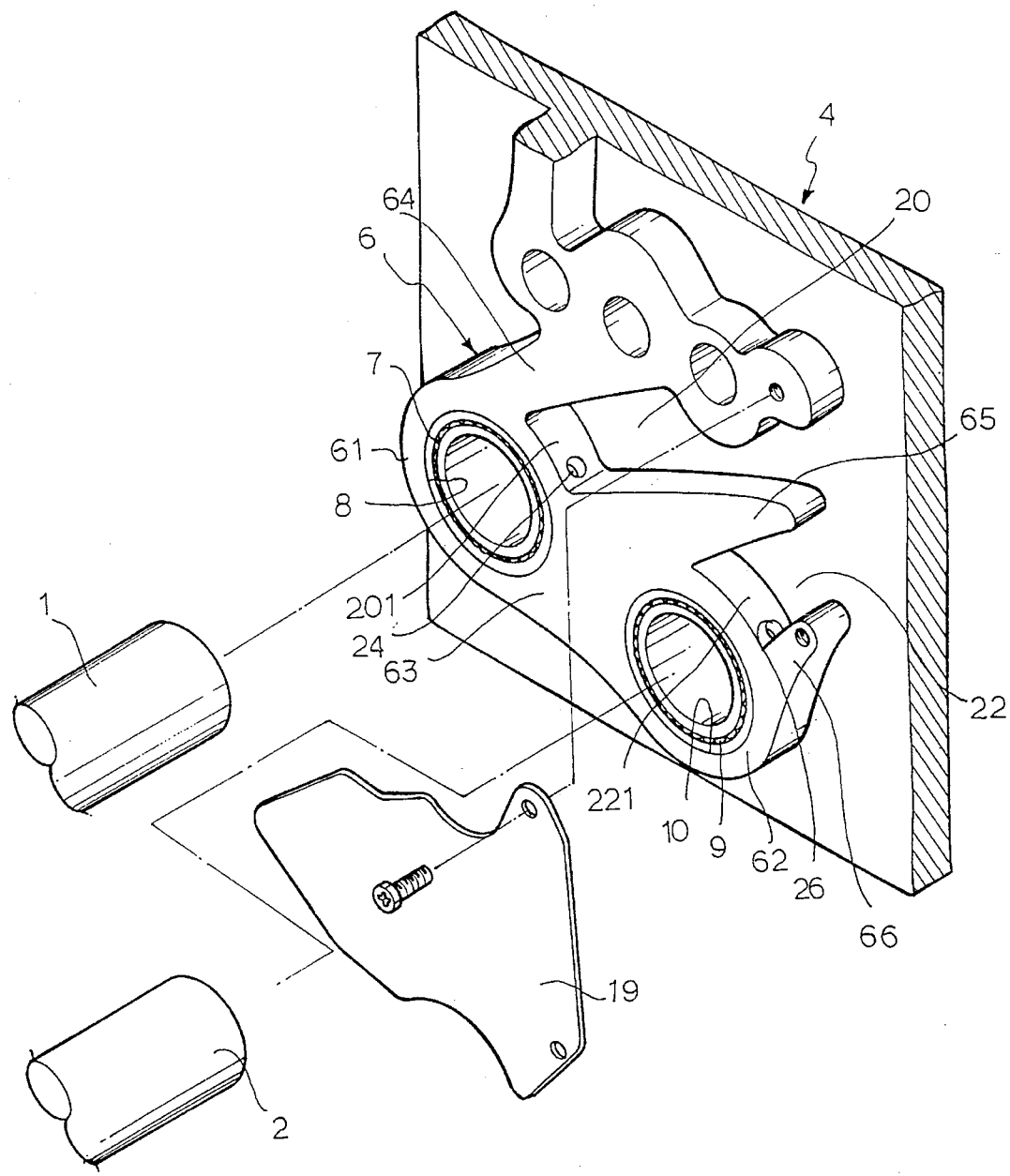
FIG. 2 is a partially enlarged perspective view showing the oil supplying structure.

FIGS. 1 and 2 are respectively a perspective view and a partially enlarged exploded perspective view showing a transmission housing provided with an oil supplying structure for a gear shaft bearing of a transmission according to a preferred embodiment of the present invention. Reference numeral 4 indicates a transmission housing rotatably supporting input and output gear shafts 1 and 2 of the transmission.

A supporting boss 6 integrally projects from an inner surface of the housing 4 to support the input and output shafts 1 and 2 within the transmission housing 4.

The supporting boss 6 is provided with input and output shaft fixing holes 8 and 10 through which bearings 7 and 9 for supporting the input and output shafts 1 and 2 are inserted, respectively. The input and output shafts 1 and 2 are generally shafts around which a synchronizer assembly is disposed.

More in detail, the supporting boss comprises a first boss portion 61 through which the input shaft fixing hole 8 is formed, the second boss portion 62 through which the output shaft fixing hole 10 is formed, and a third boss portion 63 integrally formed between the first and second boss portions 61 and 62. The supporting boss 6 further comprises a first oil guide boss 64 extending integrally upwardly from the first boss portion 61 with a predetermined slope, a second oil guide boss 65 extending integrally upwardly from the third boss portion 63 with a predetermined slope and a third oil guide boss 66 extending integrally upwardly from the second boss portion 62 with a predetermined slope.

Accordingly, the first and second oil guide bosses 64 and 65 define the first oil guide channel 20 with the inner surface of the housing 4.

A first oil passage 24 is formed on a wall 201 of the first boss portion 61 which is defined between the first and second oil guide bosses 64 and 65 whereby the input shaft fixing hole 8 communicates with the first oil guide channel 20. As a result, the oil flowing along the first oil guide channel 20 is supplied to the bearing 7 through the first oil passage 24.

Further, the second and third oil guide bosses 65 and 66 define the second oil guide channel 22 with the inner surface of the housing 4.

A second oil passage 26 is formed on a wall 221 of the second boss portion 62 which is defined between the output shaft second and third oil guide bosses 65 and 66 whereby the fixing hole 10 communicates with the second oil guide channel 22. As a result the oil flowing along the oil guide channel 22 is supplied to the bearing 9 through the oil passage 26.

Figure 4:
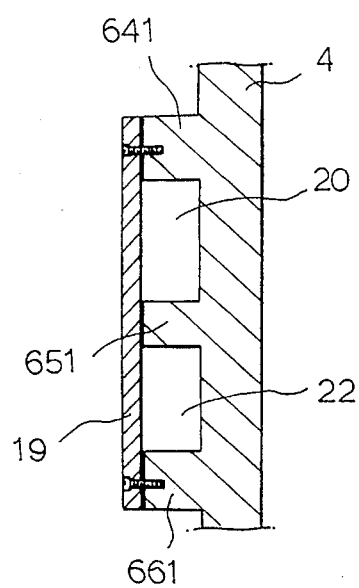
FIG. 4 is a cross sectional view taken along line 4—4 of FIG. 3.
Figure 5:
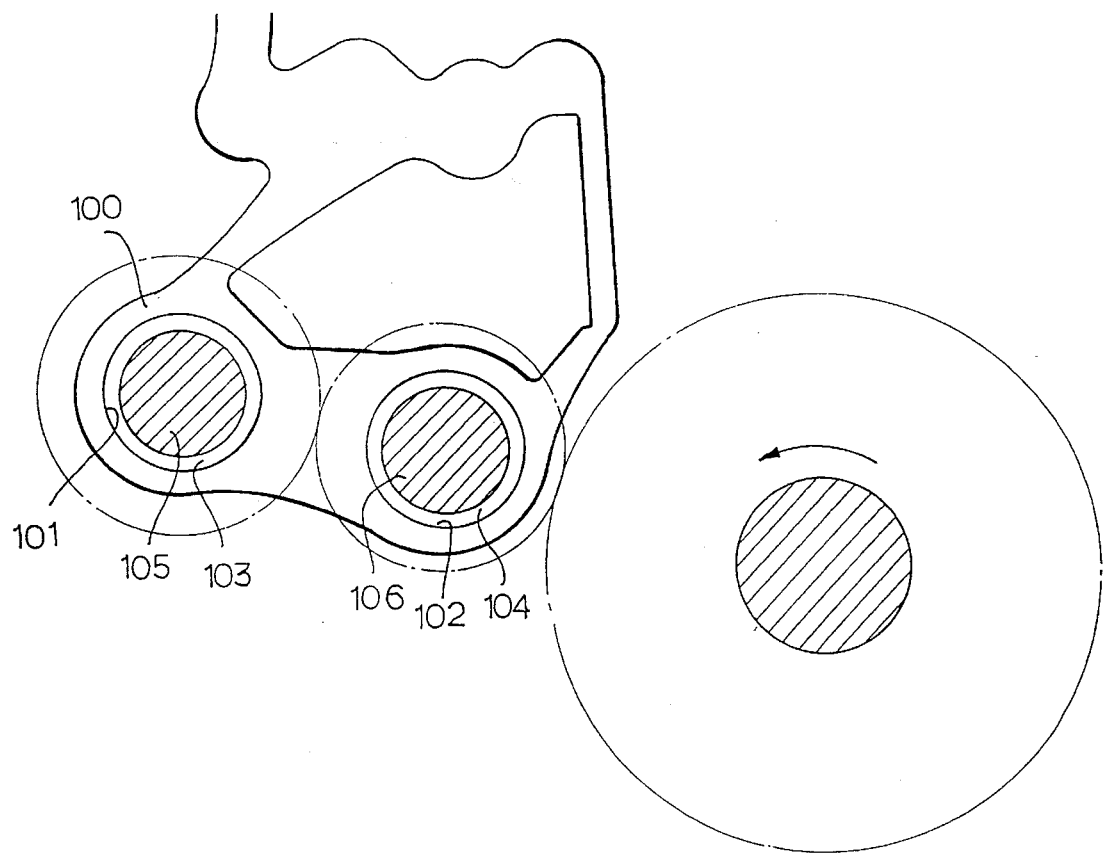
FIG. 5 is a cross sectional view illustrating a conventional gear shaft supporting structure.

Surfaces of each oil guide boss 64, 65 and 66 are covered with a cover 19 whereby the channels 20 and 22 are to be complete oil holes, respectively.(See FIG. 4.)

Figure 3:
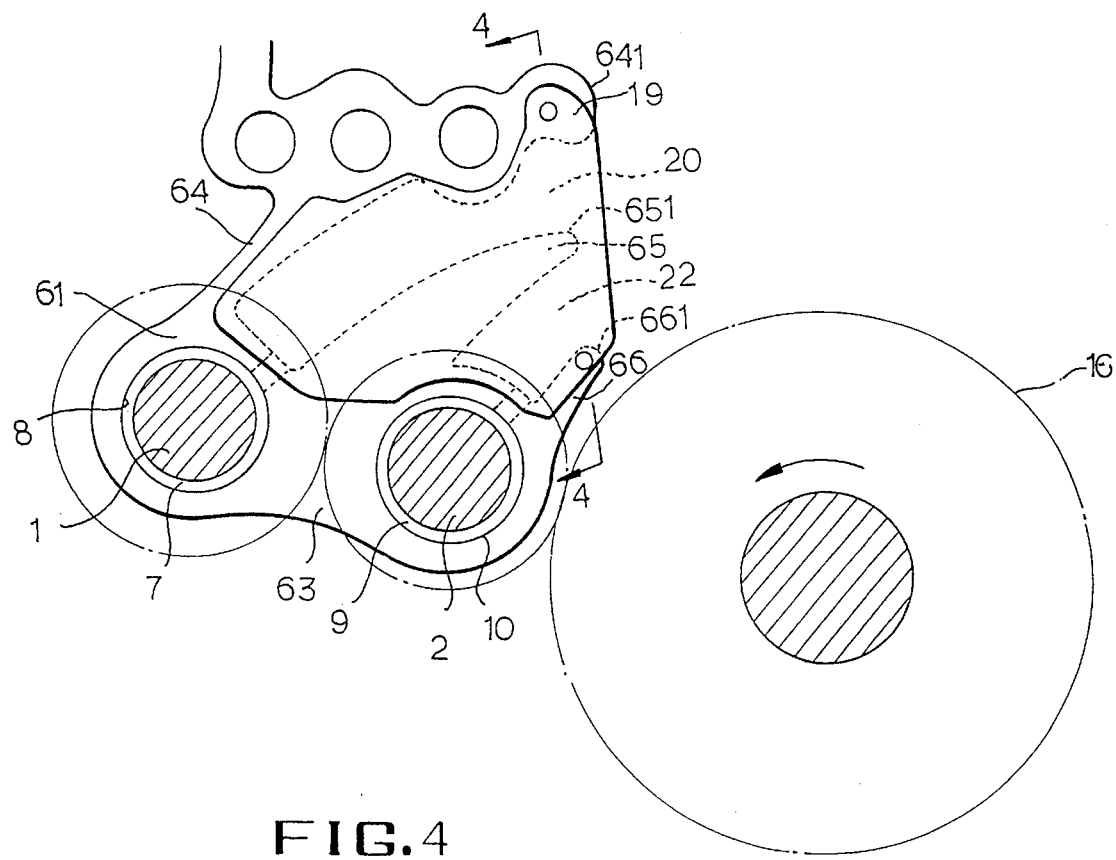
FIG. 3 is a front view showing the oil supplying structure.

Referring to FIG. 3, the oil guide bosses extend upwardly and are slanted toward a differential gear 16 such that an oil inlet of the first oil guide channel 20 which is defined between extreme ends 641 and 651 of each first and second guide boss 64 and 65 looks out on the differential gear 16 and an oil inlet of the second oil guide channel 22 which is defined between extreme ends 651 and 661 of each second and third oil guide boss 65 and 66 also looks out on the differential gear 16.

Accordingly, when the engine operates, the differential gear 16, partially sinking in the oil, rotates counter-clockwise in the drawing such that the oil is scattered toward the oil inlets of each first and second oil guide channel and flows along the channels 20 and 22 such that the oil is supplied to each bearing 7 and 9 through the respective oil passages 24 and 26.

As described above, it is possible to minimized the friction drag and power loss by sufficiently supplying the oil to the bearing.

Although preferred embodiments of the present invention have been described in detail hereinabove, it should be clearly understood that many variations and/or modification of the basic inventive concepts herein taught which may appear to those skilled in the pertinent art will still fall within the spirit and scope of the present invention, as defined in the appended claims.

What is claimed is:

1. An oil supplying structure for a gear shaft bearing, comprising:

a housing in which a gear shaft is disposed;

a gear shaft supporting boss integrally projecting from an inner surface of said housing and having an outer peripheral surface formed transverse to the inner surface of said housing;

a fixing hole through which a gear shaft bearing is disposed to rotatably support the gear shaft, said fixing hole being formed within said supporting boss;

an oil guide channel defined within the outer peripheral surface of said supporting boss and the inner surface of said housing for guiding oil scattered by a differential gear; and an oil passage radially extending from said fixing hole to said oil guide channel for supplying oil from said oil guide channel to the bearing.

2. The oil supplying structure according to claim 1, wherein said oil guide channel is formed toward the differential gear.

3. The oil supplying structure according to claim 1, wherein said supporting boss is covered with a cover to stably supply the oil flowing along said oil guide channel to said oil passage.

4. An oil supplying structure for input and output shaft bearings, comprising:

a housing in which input and output shafts are disposed;

a supporting boss integrally projecting from an inner surface of said housing and having outer peripheral surfaces formed transverse to the inner surface of said housing;

first and second fixing holes formed through said supporting boss and rotatably supporting the input and output shafts by receiving input and output shaft bearings therein, respectively;

first and second oil guide channels defined within the outer peripheral surfaces of said supporting boss and the inner surface of said housing; and first and second oil guide passages each radially extending from each fixing hole to the respective oil guide channels for supplying the oil from said oil guide channels to each bearing.

5. The oil supplying structure according to claim 4, wherein said supporting boss includes a first boss portion through which said first fixing hole is formed, a second boss portion through which said second fixing hole is formed, a third boss portion integrally formed between the first and second boss portions, a first oil guide boss extending substantially radially outward from the first boss portion with a first predetermined slope, a second oil guide boss extending substantially radially outward from the third boss portion with a second predetermined slope and a third oil guide boss extending substantially radially outward from the second boss portion with a third predetermined slope, said first oil guide channel is defined by said first and second oil guide bosses and the inner surface of said housing and said second oil guide channel is defined by said second and third oil guide bosses and the inner surface of said housing.

6. The oil supplying structure according to claim 5, wherein the first, second and third oil guide bosses slopes toward a differential gear.

7. The oil supplying structure according to claim 5, wherein said first and second oil guide passages are formed on each wall defined by the respective first and second boss portions.

8. The oil supplying structure according to claim 4, wherein said supporting boss is covered with a cover to supply the oil to said first and second oil guide passages.

9. An oil supplying structure for input and output shaft bearings, comprising:

a housing in which input and output shafts are disposed;

a supporting boss integrally projecting from an inner surface of said housing;

first and second fixing holes formed through said supporting boss and rotatably supporting the input and output shafts by receiving the input and output shaft bearings therein, respectively;

first and second oil guide channels defined within the outer peripheral surface of said supporting boss and the inner surface of said housing; and first and second oil guide passages communicating each fixing hole with the respective channels for supplying the oil flowing along said oil guide channels to each bearing, wherein said supporting boss includes a first boss portion through which said first fixing hole is formed, a second boss portion through which said second fixing hole is formed, a third boss portion integrally formed between the first and second boss portions, a first oil guide boss extending substantially radially outward from the first boss portion with a first predetermined slope, a second oil guide boss extending substantially radially outward from the third boss portion with a second predetermined slope and a third oil guide boss extending substantially radially outward from the second boss portion with a third predetermined slope, said first oil guide channel is defined by said first and second oil guide bosses and the inner surface of said housing and said second oil guide channel is defined by said second and third oil guide bosses and the inner surface of said housing.

10. The oil supplying structure according to claim 9, wherein the first, second and third oil guide bosses slope toward a differential gear.

11. The oil supplying structure according to claim 9, wherein said first and second oil guide passages are formed on each wall defined by the respective first and second boss portions.

12. The oil supplying structure according to claim 9, wherein said supporting boss is covered with a cover to contain the oil within said first and second oil guide passages.

* * * * *